United States Patent [19]

Berner

[11] 4,379,107

[45] Apr. 5, 1983

[54] METHOD AND APPARATUS FOR THE CONTINUOUS PRODUCTION OF A UNIFORM SLAB OR SHEET FROM HEAT EXPANDABLE THERMOPLASTIC PARTICLES

[76] Inventor: Rolf E. Berner, R.D. #6, Box 1444, New Castle, Pa. 16103

[21] Appl. No.: 283,281

[22] Filed: Jul. 14, 1981

[51] Int. Cl.³ .................... B29D 27/00; B29C 29/00
[52] U.S. Cl. ........................ 264/51; 264/53; 264/87; 425/4 C; 425/85; 425/365; 425/DIG. 60
[58] Field of Search .......................... 264/53, 51, 87; 425/4 C, 365, 85, DIG. 60

[56] References Cited

U.S. PATENT DOCUMENTS

| | | | |
|---|---|---|---|
| Re. 27,964 | 4/1974 | Berner | 264/51 |
| 3,242,238 | 3/1966 | Edberg et al. | 264/53 X |
| 3,248,461 | 4/1966 | Willes et al. | 264/53 X |
| 3,253,064 | 5/1966 | Buonaiuto | 264/53 X |
| 3,427,372 | 2/1969 | Berner | 264/51 |
| 3,856,903 | 12/1974 | Schaeffer | 264/51 |

OTHER PUBLICATIONS

Bender, Rene J. "Handbook of Foamed Plastics" Libertyville, Ill., Lake Publishing Corp., ©1965, pp. 10-11.

*Primary Examiner*—Philip E. Anderson
*Attorney, Agent, or Firm*—Stephen Ross Green

[57] ABSTRACT

This invention is directed to an apparatus and method for producing a continuously molded thermoplastic sheet from heat expandable granules in a heated zone within a molding channel. The disclosed invention includes introducing a predetermined amount of water into the molding channel to wet the granules either prior to or contemporaneously with the introduction of a hot gas into the granules to expand the granules into a continuous thermoplastic sheet. The water is drained from the channel subsequent to the expansion of the granules.

13 Claims, 3 Drawing Figures

METHOD AND APPARATUS FOR THE CONTINUOUS PRODUCTION OF A UNIFORM SLAB OR SHEET FROM HEAT EXPANDABLE THERMOPLASTIC PARTICLES

This invention relates to a method and apparatus for expanding thermoplastic granules. More specifically a method and apparatus are disclosed for producing a continuously molded thermoplastic sheet from heat expandable granules in a heated zone within a molding channel. The disclosed invention includes introducing a predetermined amount of water into the molding channel to wet the granules either prior to or contemporaneously with the introduction of a hot gas into the granules to expand the granules into a continuous thermoplastic sheet. The water is drained from the channel subsequent to the expansion of the granules.

DESCRIPTION OF THE PRIOR ART

Continuous slabs or sheets may be made by applying heat to granules of thermoplastic containing a blowing agent. The blowing agent used to expand the thermoplastic is generally a low boiling point hydrocarbon such as pentane. Upon application of heat, the blowing agent is vaporized thereby expanding the volume of the thermoplastic granules. Objects or articles having predetermined physical characteristics or shapes may be made by expanding the granules inside a mold having an appropriate interior shape. In addition, continuous sheets or slabs may be formed by a continuous expansion process taking place in a molding channel having predetermined interior characteristics from which the formed slab or sheet will take its configuration in cross section. This is frequently accomplished by moving the accumulated granules through the molding channel by the frictional effects of one or more movable walls of the channel. Hence, assuming a rectangular cross section of the slab to be formed, the slab moves through the channel relative to at least two and frequently three of the rectangular walls which form the slab. Although low friction coatings are frequently applied to the non-moving walls to reduce shearing effects on the melting granules, the frictional effects against the walls against which the slab moves are self-evident and frequently give rise to tearing or shearing effects on the slab against those non-moving sides which effects greatly reduce the quality of the finished slab or sheet. In addition, because heat is frequently applied to the granules in the mold in the form of hot air or steam injected throughout the granules, a sudden initial "blowing apart" of the granules may occur contemporaneously with the injection of the hot air or steam but prior to the expansion and softening of the granules, since the granules do not adhere to one another until their melting points are reached. This problem is compounded by initial uneven transportation of granules throughout the molding channel. The result may appear as pockets or variations in density throughout the slab due to the "blowing apart" of the granules before they have had a chance to reach their melting temperature and adhere to one another. During periods of low humidity, static electricity builds up in the granules, causing them to be repelled from one another due to like charges, again effecting the quality of the finished product. Finally, the frictional effects of the slab against the walls of the channel result in the requirements of a considerable amount of power and energy to move the slab or sheet through the channel continuously at uniform speed. These frictional forces are considerable and their reduction would result in a savings in energy and hence cost of the finished product. The invention, to be described more fully hereinafter, remedies the deficiencies noted in respect of the prior art and further, includes many features not available therein.

It is therefore an object of this invention to provide a method and apparatus for producing a continuously molded thermoplastic sheet which sheet is of a superior quality to that formed by other known processes, specifically, the sheet or slab having no pockets or voids caused by the blowing apart of the thermoplastic granules prior to their expansion and adhesion, or the effects of static electricity upon the granules.

A further object of the invention is to provide an improved quality sheet or slab free of any shearing or tearing abrasions on its surface.

Yet another object of the invention is to provide a method and apparatus for producing a continuous sheet or slab of thermoplastic material requiring less power and/or energy during processing.

Still a further object of the invention is to provide an improved finished slab by providing an even distribution of the granules across the molding channel.

In the attaining of the foregoing objects, the invention provides a method and apparatus for producing a slab or sheet of expanded thermoplastic material in which a hot gas such as hot air or steam is introduced to thermoplastic granules containing a heat-expanding agent in a heated zone associated with a molding channel. The molding channel has an inner concentric arcuate surface and an outer concentric arcuate surface, the inner concentric arcuate surface being movable with respect to the outer concentric arcuate surface. Both surfaces are perforated to allow liquid and gas to pass through. The interior of the inner concentric arcuate surface may be circular and contain a vaccum for purposes of cooling the formed slab. The hot gas and water are introduced throughout the granules of thermoplastic in the heating zone through the perforations in the outer concentric arcuate surface. The water which may contain a coloring additive, causes the thermoplastic granules to adhere to one another so that the introduction of the hot gas does not cause the granules to separate or be blown apart. Upon the expansion of the thermoplastic granules, the heat causes a portion of the water to evaporate. This vapor, together with any remaining liquid water, is evacuated through the perforations in the inner arcuate surface and drained out of the interior surrounded by said surface by way of a drain. A metering pump may be used to continuously supply a predetermined amount of the water.

Other objects and advantages of the present invention will become apparent from the ensuing description of an illustrative embodiment thereof, in the course of which reference is made to the accompanying drawings in which.

DESCRIPTION OF THE PREFERRED EMBODIMENT

Figure 1:
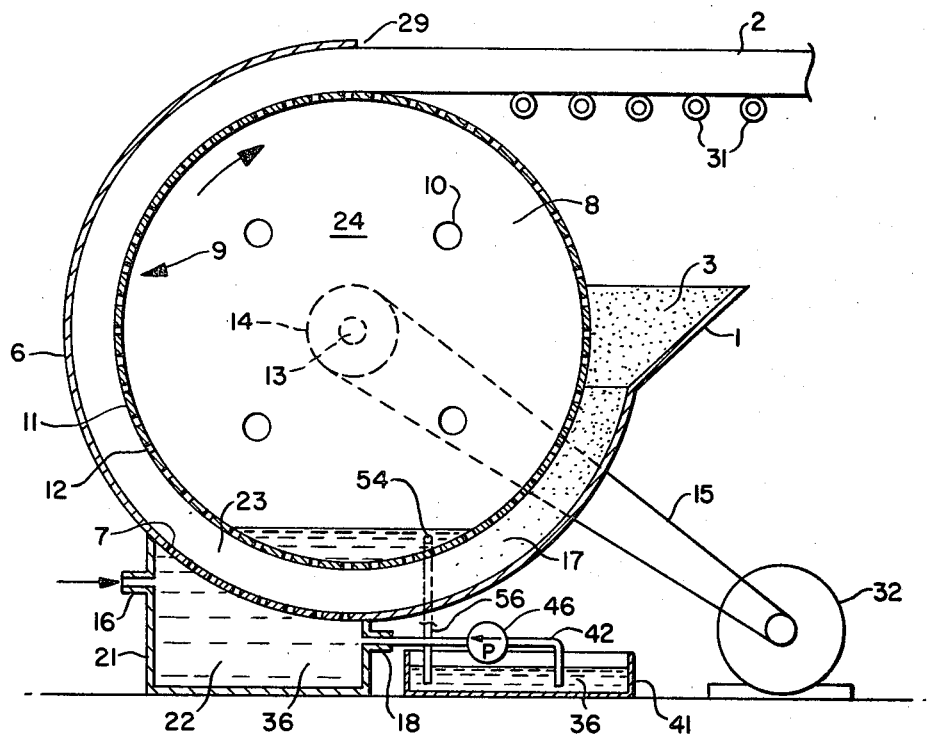
FIG. 1 illustrates a side view in sectional format of the preferred embodiment of the invention disclosing a molding channel formed by an inner arcuate concentric surface being substantially circular in form, and an outer concentric arcurate surface surrounding it.

A clearer understanding of the invention will be obtained if FIG. 1 is studied in conjunction with the description that follows.

Figure 3:
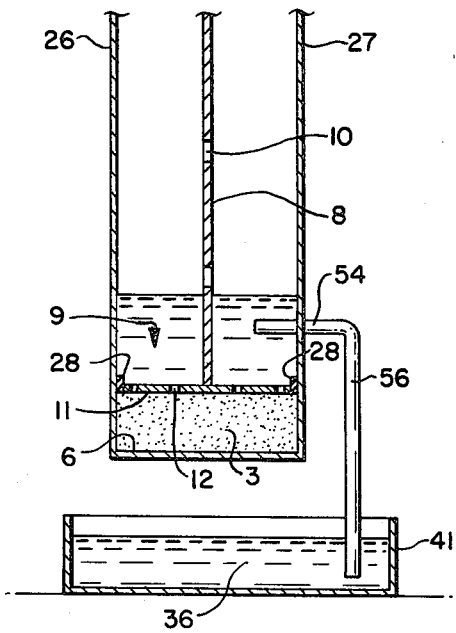
FIG. 3 is a partial section of a portion of FIG. 2 showing the water being drained from the interior of the inner arcuate surface.

Referring to FIGS. 1 and 3, there is shown hopper 1 which contains granules of expandable thermoplastic 3. Due to the configuration of hopper 1, granules 3 are directed by gravity toward rotating drum 9. Drum 9 is disclosed as being substantially circular in nature and has an inner arcuate surface 11, which inner arcuate surface 11 has perforations 12 extending therethrough to the interior 24 of drum 9. Drum 9 rotates about shaft 13 because it is secured to the periphery of disc 8, disc 8 being secured to shaft 13. Disc 8 has a plurality of holes 10 therethrough to permit equalizational temperature and pressure within interior 24 of drum 9. Secured to shaft 13 is pulley 14, pulley 14 being driven by belt 15 which in turn is driven by motor 32 at a predetermined speed.

Drum 9 rotates between first wall 26 and second wall 27, which both remain stationary as drum 9 rotates. Referring now to FIG. 3, gaskets 28 serve to provide a water-tight seal between the sides of drum 9 and first wall 26 and second wall 27. First wall 26 and second wall 27 extend beyond the diameter of drum 9 to an outer arcuate surface 6, thereby forming an arcuate molding channel 17 which is rectangular in cross section, having as its boundaries the arcuate surface of drum 9, outer arcuate surface 6, first wall 26 and second wall 27. Outer arcuate surface 6, first wall 26 and second wall 27 may have an antifriction coating applied to them to reduce the frictional effects with slab 2.

Figure 2:
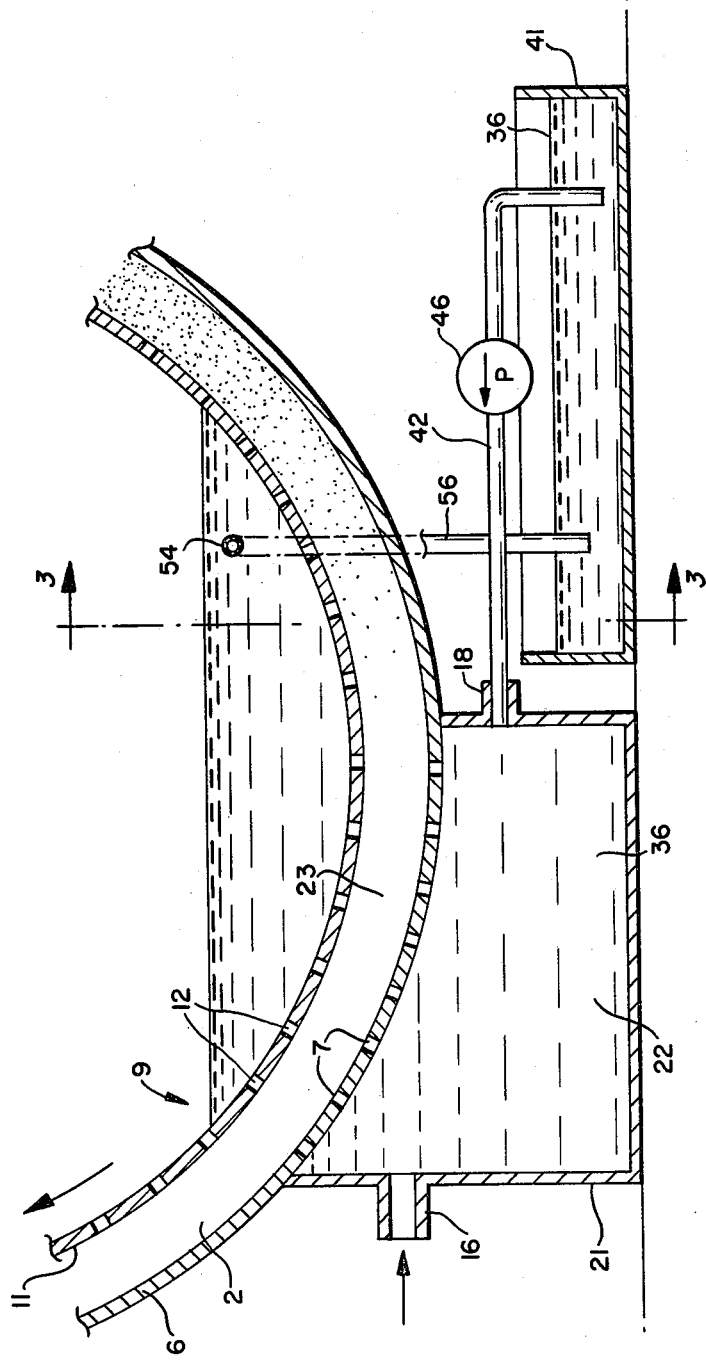
FIG. 2 is a detailed view also in sectional format of a portion of the invention showing the introduction of hot gas and water into the thermoplastic granules within a molding channel.

Referring now to FIGS. 1 and 2, chest 21 is secured to outer arcuate surface 6 at a point downstream of hopper 1 and encloses chamber 22. In the vicinity where chest 21 is secured to outer arcuate surface 6, outer arcuate surface 6 is provided with perforations 7 extending through outer arcuate surface 6. Chest 21 has hot gas inlet 16 and water inlet 18 which enable hot gas entering through hot gas inlet 16 and water 36 entering through water inlet 18 to fill chest 21. Hot gas from chest 21 is transferred into heated zone 23 through perforations 7 as will be hereinafter described.

Water reservoir 41 contains a supply of water 36. Water 36 may contain a coloring additive to add coloration to the finished slab 2. The preferred embodiment of the invention as disclosed herein uses water to wet granules 3 causing them to adhere to one another. Obviously, other liquids not having a water base may be used to achieve the desired objects of the invention. For example, it is well known in the art that mineral oil dispersed through the granules during heating will improve the fusion of the granules to one another as they are heated, and hence, to achieve this advantage in addition to the objects and advantages set forth above, mineral oil may be used as a wetting agent in the same manner as water 36. Pump 46 communicates with water line 42 and transfers water 36 at a predetermined rate of flow from reservoir 41 to water inlet 18 of chest 21 to which water line 42 is secured. Water 36 enters chest 21 and fills chest 21. Upon reaching a certain level within chamber 22 of chest 21, water 36 is able to pass through perforations 7 of outer arcuate surface 6 and enter heated zone 23 of molding channel 17.

Although the exact amount of water 36 delivered by pump 46 to chest 21 and to heated zone 23 is not critical, the flow of water 36 should be sufficient to adequately wet granules 3 to promote the desired adhesion among granules 3. One might suppose that a maximum rate of flow of water 36 will be quickly reached, at which maximum, the large amount of water 36 in heated zone 23 would cause granules 3 to be dispersed throughout and suspended in water 36 in heated zone 23 thus impeding the transfer of heat from the hot gas to granules 3. However, in practice, I have found that this maximum amount is not reached unless the rate of flow of water 36 is very large. Thus, as aforesaid, the amount and rate of flow of water 36 into heated zone 23 is not critical, and a considerable tolerance is permissible. Water 36 is returned to reservoir 41 from interior 24 of drum 9 by entering drain inlet 54 of drain line 56. Drain inlet 54 passes through second wall 27 from the interior 24 of drum 9. As water 36 entering interior 24 of drum 9 through perforations 12 in inner arcuate surface 11 of drum 9 reaches a predetermined level within interior 24 of drum 9, it enters drain inlet 54 and is able to pass through drain line 56 and return by gravity to reservoir 41. Slab 2 continues to move through molding channel 17 and exits molding channel 17 at discharge 29.

Finally, rollers 31 are situated in proximity to discharge 29 so as to receive slab 2 as same is formed.

OPERATION

As drum 9 is rotated in the direction of the arrow, granules 3 residing in hopper 1 enter molding channel 17 which is formed as hereinabove described by the arcuate surface of drum 9, first wall 26, second wall 27, and outer arcuate surface 6. Outer arcuate surface 6, first wall 26, and second wall 27, of course, remain stationary. Granules 3 enter molding channel 17 by gravity and are pulled through molding channel 17 due to their frictional contact with drum 9, to a location in proximity with chest 21. A hot gas such as steam or hot air is introduced through hot gas inlet 16 and enters chest 21. At substantially the same time, pump 46 delivers a predetermined amount of water 36 from reservoir 41 through water line 42 to water inlet 18 of chest 21, whereby water 36 is likewise able to enter chamber 22. The level of water 36 rises in chamber 22 until it reaches perforations 7 of outer arcuate surface 6. Water 36 is prevented from draining from chamber 22 through hot gas inlet 16 due to the pressure of the hot gas at hot gas inlet 16. Water 36 and the hot gas, due to their pressurized state, pass from chest 21 through perforations 7 of outer arcuate surface 6 and thus are introduced throughout granules 3 in heated zone 23 of molding channel 17. Because of the wetting action of water 36, granules 3 immediately tend to adhere to one another and as a result are more evenly transported throughout molding channel 17 and are not blown apart as hot gas is introduced through perforations 7. The heat contained in the hot gas entering heated zone 23 through perforations 7 is transferred to granules 3 in heated zone 23 by conduction whereupon granules 3 expand due to the expansion of the blowing agent which they contain. In addition, some of the heat contained in the hot gas is transferred to water 36 which vaporizes as steam. Granules 3 continue to move past heated zone 23 of molding channel 17 due to their frictional contact with the inner arcuate surface 11 of drum 9. Meanwhile, the hot gas, steam and any residual water 36 having passed through granules 3, thereupon enter interior 24 of drum 9 through perforations 12 throughout inner arcuate surface 11 of drum 9, due to the pressure differential between heated zone 23 and interior 24 of drum 9. Water 36 collects in interior 24 of drum 9 and upon reaching a predetermined level within the interior of drum 9, the water 36 which has accumulated therein enters drain inlet 54 and passes through second wall 27 into drain line 56 returning by gravity to water reservoir 41. If the hot gas is steam, accumulated steam in interior 24 of drum 9 may condense into water and likewise pass through drain inlet 54 and drain line 56 or alternatively may be allowed to escape into the atmosphere.

The expanded granules 3 continue throughout molding channel 17 due to the frictional contact with inner arcuate surface 11 of drum 9. By the time granules 3 have passed through heated zone 23, granules 3 have expanded and agglomerated into foam board 2. Foam board 2 may be cooled by any number of cooling methods such as applying a vacuum to the interior 24 of drum 9 whereby cooling air is pulled through foam board 2 by way of perforations 12 in inner arcuate surface 11 or foam board 2 may simply be allowed to cool without external assistance. Thereupon, foam board 2 leaves contact with drum 9 at discharge 29 and is received by rollers 31 to be directed to an appropriate location for any further processing if so desired.

Based on the foregoing description, it may be seen that the present invention provides a device which greatly improves the quality of the slab or sheet of thermoplastic material produced. In addition, due to the lubricating qualities of the water as hereinabove described, the power required to produce the board is reduced by approximately 80%. Further, it will be found that the consistency and density of the slab is uniform throughout and does not contain pockets or density variations due to uneven distribution of granules in the molding channel or the blowing apart of the granules before they have had a chance to adhere to one another due to their reaching their melting point. Finally, static electricity charges in the granules of thermoplastic are reduced or eliminated due to the presence of the wetting agent thereby enhancing the quality of the finished product.

Although but one embodiment of the present invention has been illustrated and described, it will be apparent to those skilled in the art that various changes and modifications may be made therein without departing from the spirit of the invention, and the invention is only limited as set forth in the accompanying claims.

I claim:

1. A method for producing a continuously molded thermoplastic sheet from heat expandable granules in a heated zone within a molding channel comprising:
   a. introducing water into said molding channel to cause said granules to adhere to one another; and
   b. introducing a hot gas into contact with said wetted granules to expand said granules into said thermoplastic sheet.

2. The method as defined in claim 1 wherein said water is introduced throughout said granules contemporaneously with the introduction of said hot gas.

3. The method as defined in claim 1 wherein said water is introduced throughout said granules prior to the introduction of said hot gas.

4. The method as defined in claim 1 wherein said water contains a coloring additive.

5. The method of claim 1 wherein said molding channel has at least two oppositely spaced perforated surfaces, said hot gas and wetting agent being introduced through one of said perforated surfaces and evacuated therefrom through said other perforated surface.

6. The method as set forth in claim 5 wherein said oppositely spaced perforated surfaces include inner and outer concentric arcuate surfaces, said inner arcuate surface being movable relative to said outer arcuate surface, said hot gas and water being introduced through said perforations in said outer arcuate surface and evacuated therefrom through said perforations in said inner arcuate surface.

7. The method of claim 1 wherein said hot gas is selected from the group consisting of hot air and steam.

8. In a method for producing a continuously molded sheet, said method being of the type wherein a hot gas selected from the group consisting of hot air and steam is introduced to thermoplastic granules containing a heat expanding agent in at least one heated zone associated with a molding channel, said molding channel having inner and outer concentric arcuate surfaces, which inner and outer concentric arcuate surfaces have perforations therethrough, said hot gas being introduced through said perforations in said outer concentric arcuate surface, the improvement comprising:
   a. introducing an amount of water throughout said granules in said molding channel, through said perforations in said outer concentric arcuate surface to cause said granules to adhere to one another; and,
   b. evacuating said water from said molding channel subsequent to expanding said granules, through said perforations in said inner concentric arcuate surface.

9. In combination with an apparatus for producing a continuously molded sheet, said apparatus including means for delivering granules of a thermoplastic material containing a heat expanding agent to an open ended molding channel, said molding channel having at least one heated zone associated therewith wherein said granules are subjected to a hot gas introduced into said heated zone for continuously expanding and molding said granules within said molding channel, the improvement comprising:
   (a) metering means for introducing a predetermined amount of a water into said molding channel in conjunction with said introduction of said hot gas; and
   (b) draining means for evacuating said water from said molding channel subsequent to the expansion of said granules.

10. The apparatus of claim 9 wherein said metering means includes pump means for delivering said water into said molding channel.

11. The apparatus of claim 9 wherein said molding channel includes at least two oppositely spaced perforated surfaces, said hot gas and water being introduced into said molding channel through one of said perforated surfaces and evacuated therefrom through said other perforated surface.

12. The apparatus of claim 11 wherein said oppositely spaced perforated surfaces include inner and outer concentric arcuate surfaces, said inner arcuate surface being movable relative to said outer arcuate surface, said hot gas and water being introduced into said molding channel through said perforations in said outer arcuate surface and evacuated therefrom through said perforations in said inner arcuate surface.

13. In combination with an apparatus for producing a continuously molded sheet, said apparatus including means for delivering granules of a thermoplastic material containing a heat expanding agent to an open ended molding channel, said molding channel having inner and outer concentric arcuate surfaces having perforations therethrough and further having at least one heated zone associated therewith wherein said granules are subjected to a hot gas selected from the group consisting of hot air and steam introduced into said molding channel through said perforations of said outer concentric arcuate surface for continuously expanding and molding said granules within said molding channel, the improvement comprising:

(a) pump means for introducing an amount of water through said perforations of said outer concentric arcuate surface into said molding channel in conjunction with said introduction of said hot gas; and, (b) draining means for evacuating said water from said molding channel through said perforations in said inner concentric arcuate surface upon the expansion of said granules.

* * * * *